(12) United States Patent
Ozbaysal

(10) Patent No.: US 7,867,628 B2
(45) Date of Patent: *Jan. 11, 2011

(54) BRAZED ARTICLES

(75) Inventor: Kazim Ozbaysal, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 597 days.

This patent is subject to a terminal disclaimer.

(21) Appl. No.: 11/865,963

(22) Filed: Oct. 2, 2007

(65) Prior Publication Data
US 2008/0020233 A1 Jan. 24, 2008

Related U.S. Application Data

(63) Continuation-in-part of application No. 11/272,981, filed on Nov. 14, 2005, now Pat. No. 7,293,688.

(51) Int. Cl.
*B32B 15/01* (2006.01)
*B32B 15/04* (2006.01)
*B32B 15/20* (2006.01)
*F03B 3/00* (2006.01)
*F01D 5/00* (2006.01)

(52) U.S. Cl. ........................ 428/660; 428/671; 428/673; 428/674; 428/675; 428/678; 428/627; 416/229 R

(58) Field of Classification Search ................. 428/660, 428/671, 672, 673, 674, 675, 678, 680, 668, 428/627, 634
See application file for complete search history.

(56) References Cited

U.S. PATENT DOCUMENTS 7,293,688 B2 * 11/2007 Ozbaysal .................... 228/56.3

FOREIGN PATENT DOCUMENTS

JP          08-310877      * 11/1996

OTHER PUBLICATIONS

Machine Translation, Kashiwagi, JP 08-310877, Nov. 1996.*

* cited by examiner

*Primary Examiner*—Michael La Villa
(74) *Attorney, Agent, or Firm*—Marcella R. Louke; William Scott Andes; General Electric Company

(57) ABSTRACT

A brazing material for brazing tungsten/carbide/cobalt substrates (e.g., wear pads) to substrates comprising titanium or alloys thereof (e.g., fan or compressor blades). The brazing material includes gold, nickel, silver, aluminum, and copper present in respective amounts to provide a post-braze hardness of between 450 and 600 KHN to thereby increase the impact resistance of the braze joint. The substrates may be brazed by induction heating at temperatures less than about 1800° F. (982° C.).

4 Claims, 2 Drawing Sheets

BRAZED ARTICLES

CROSS REFERENCE TO RELATED APPLICATIONS

This application is a Continuation-in-Part of application Ser. No. 11/272,981, filed Nov. 14, 2005, now U.S. Pat. No. 7,293,688, issued Nov. 13, 2007, which is herein incorporated by reference in its entirety.

TECHNICAL FIELD

Embodiments herein relate generally to brazing materials, brazing methods, and brazed articles. More particularly, embodiments herein relate to materials and methods for brazing tungsten carbide-cobalt materials to titanium and alloys thereof, and articles formed thereby.

BACKGROUND OF THE INVENTION

In a gas turbine engine, air is pressurized in a compression module during operation. The air channeled through the compression module is mixed with fuel in a combustor and ignited, generating hot combustion gases which flow through turbine stages that extract energy therefrom for powering the fan and compressor rotors and generating engine thrust to propel an aircraft in flight or to power a load, such as an electrical generator.

The compression system includes a rotor assembly comprising a plurality of rotor blades extending radially outward from a disk. More specifically, each rotor blade has a dovetail which engages with the disk, a platform forming a part of the flow path, and an airfoil extending radially from the platform to a tip. The platform may be made integral to the blade or, alternatively, made separately.

In some designs, the rotor blade, especially those in a fan rotor and the front stages of a multistage compression system, have a pair of circumferentially extending shrouds on the airfoil, one projecting from the pressure surface and one projecting from the suction surface. The shrouds are located at a radial location between the blade dovetail and the blade tip. In some other designs, the shrouds may be located at the tip of the blade airfoil. During normal operation of the compression system, the blades twist and the shrouds on adjacent blades contact with each other, forming a shroud ring that provides support to the blades. During engine operation, the shroud ring resists vibration and twisting of the blades. The term "midspan shroud" is used herein to refer to all supports on fan and compression system blades that contact with each other during operation, and includes all supports located anywhere on the span of the blade, including supports at the tip of the blade. The "midspan shrouds" as used herein, may be located anywhere along the blade span, not just at the midpoint of the span.

During certain abnormal events, such as a bird impact, other foreign object impact, or stalls during engine operation, the normal contact between the shrouds of adjacent blades is disturbed. The contact forces become high and misaligned due to the impacts and the shrouds become disengaged fully or partially. This is called "shingling" of the blades. Shingling causes significant wear and tear damage on the midspan shrouds. When the speed of the compressor rotor drops, the shingled blades may rebound, causing further wear and tear on the shrouds.

Fan or compressor blades sometimes have wear pads brazed on the contact faces on the midspan shrouds. Wear pads have been used on blades to address the wear problem. For example, some compressor blades contain a brazed-on WC—Co wear pad to reduce wear between two rubbing midspan shrouds.

The blades may comprise titanium or alloys thereof (i.e., Ti 6Al-4V and/or Ti 8Al-1V-1 Mo alloys) having a beta transus temperatures at or slightly above 1800° F. (about 982° C.). The wear pads are conventionally brazed to the titanium blade using a titanium-copper-nickel (TiCuNi) alloy braze foils. Diffusion occurs between TiCuNi braze foil and WC—Co wear pad during high temperature braze. Titanium forms brittle compounds with the alloying elements of the wear pad in the braze joint. As a result, the braze joint provides a high hardness (about 1200 KHN) W—Co—Ti—Cu—Ni alloy. The braze interface exhibits cracking at impact energies as low as 0.30 joules, and the wear pad may be liberated from the substrate at the brittle braze interface at an impact energy of 0.60 Joules.

Industrially available braze alloys have been unable to meet a demand for low braze temperature (i.e., below 1800° F.), while providing the high ductility and low cost necessary for aircraft engine applications. For example, Nioro (Au 82% and Ni 18%) and Nicoro80 (Au 81.5%, Cu 16.5% and Ni 2%) are heavy in gold and light in copper and therefore are expensive and have poor wetting properties and ductility. Alloys incorporating Au 35%, Cu 62% and Ni 3% have liquidus temperatures at or above 1886° F. (about 1030° C.), which is not acceptable for brazing WC—Co substrates to titanium alloys.

Some known brazing alloys incorporating silver have also failed to meet the combined demands of low braze temperatures, high ductility and low cost necessary for aircraft engine applications. For example, CUSIL™ (63.3Ag-35.1Cu-1.0Ti) alloy lacks nickel and may cause wettability problems with WC—Co if braze times are short. Another silver alloy, 95% Ag-5% Al, lacks both copper and nickel and has been unsuccessful in corrosion wear applications of WC—Co on Ti-6Al-4V. A third alloy, a non-silver containing softer braze alloy of high copper content, Copper-ABA® (Cu-2% Al-3% Si-2.25% Ti) as well as a 50% Au-50% Ag and 69% Au-25% Ag-6% Pt have braze temperatures at or above the beta transus temperature of Ti-6Al-4V and therefore cannot be used.

Accordingly, there is a need for high ductility, impact resistant brazing alloys with brazing temperatures below the beta transus temperature of the substrate titanium alloy. In particular, there is a need for brazing alloys for brazing WC—Co materials to titanium alloys without forming a brittle braze interface.

BRIEF DESCRIPTION OF THE INVENTION

The above-mentioned need or needs may be met by exemplary embodiments which provide brazing materials that provide high ductility (a.k.a., low hardness), wettability, and low braze temperatures.

An exemplary embodiment includes a brazing material for brazing a first substrate comprising tungsten/carbide/cobalt to a second substrate comprising titanium or alloys thereof. The exemplary brazing material consists of gold, nickel, silver, aluminum, and copper, wherein copper is present in an amount sufficient to provide a post-braze hardness of between 450 and 600 KHN.

An exemplary embodiment includes a first substrate comprising tungsten/carbide/cobalt material, a second substrate comprising titanium or alloys thereof; and a braze joint at the interface of the first substrate and the second substrate. The braze joint is formed from an exemplary brazing material including about 2 to about 30 percent by weight gold, about 4 to about 14 percent by weight nickel, about 25 to about 65 percent by weight copper, about 1 to about 3 percent by weight aluminum, and about 20 to about 55 percent by weight silver.

An exemplary embodiment includes a method of improving the impact resistance of a braze joint between a midspan shroud of a fan or compressor blade for a gas turbine engine and a wear pad brazed thereto. The method includes brazing the wear pad to the midspan shroud with a brazing material comprising about 2 to about 30 wt % gold, about 4 to about 14 wt % nickel, about 20 to about 55 wt % silver, about 40 to about 60 wt % copper, and about 1 to about 2 wt % aluminum, wherein the gold, nickel, silver, copper, and aluminum are present in respective amounts to provide the brazing material with a post-braze hardness of between about 450 and about 600 KHN, and the braze joint with an impact resistance of greater than about 0.60 Joules.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
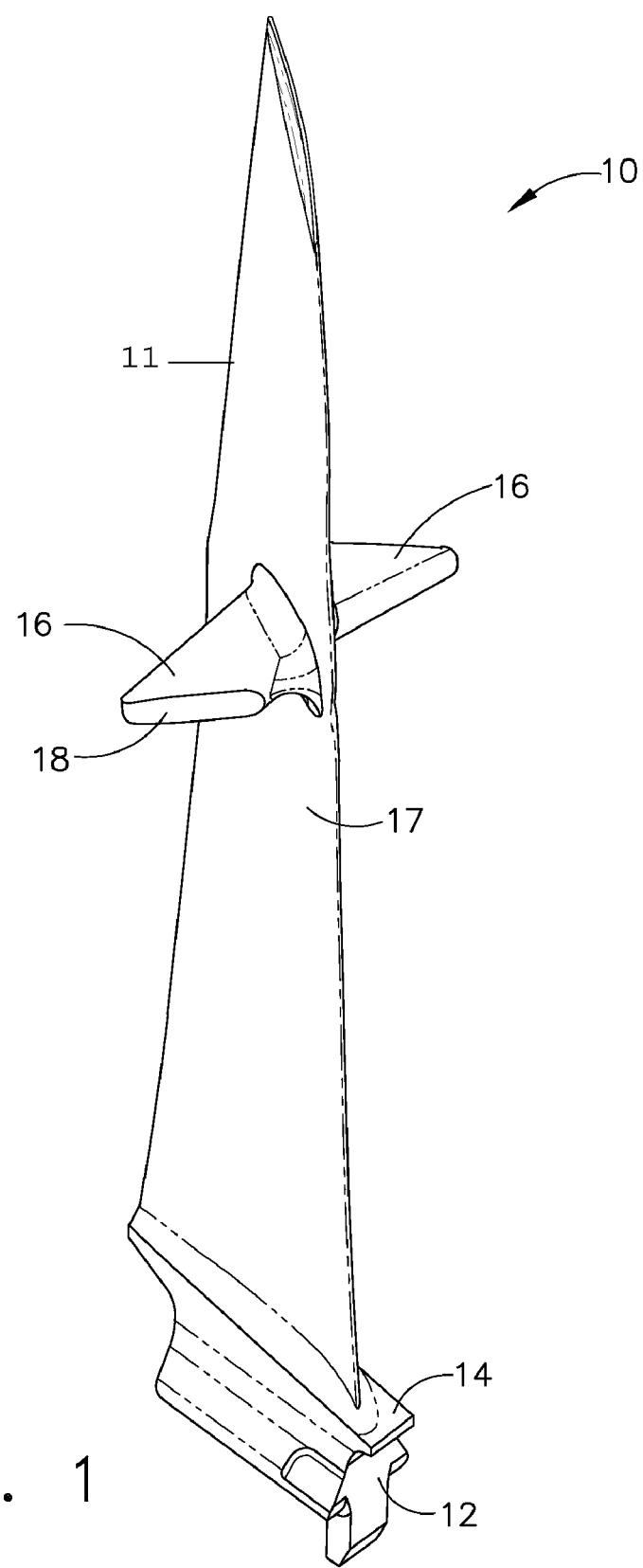
FIG. 1 is a perspective view of an exemplary compressor blade having a midspan shroud.

Referring to the drawings wherein identical reference numerals denote the same elements throughout the various views, FIG. 1 shows an exemplary compressor blade 10 having an airfoil 11, dovetail 12, a platform 14, and a midspan shroud 16 extending from the suction side 17 of the airfoil 11. The midspan shroud 16 includes a contact face 18. It will be appreciated by those with skill in the art that a similar midspan shroud extends from the pressure side of the airfoil. It will further be appreciated by those with skill in the art that blade 10 as shown is identified as a compressor blade, although the descriptions set forth herein are equally applicable to fan blades.

In fan and compressor rotor assemblies, the blades are arranged in the circumferential direction around a disk. During engine operation, the blades airfoils twist, and the midspan shroud on the suction side of a blade comes into contact with the midspan shroud on the pressure side of the adjacent blade. The shrouds, when thus engaged with each other, form a stiff ring supporting the blades to prevent vibration. As the engine shuts down the shrouds disengage. As the engines operate through many cycles, the contact faces of the shrouds are subjected to significant wear and tear.

Figure 2:
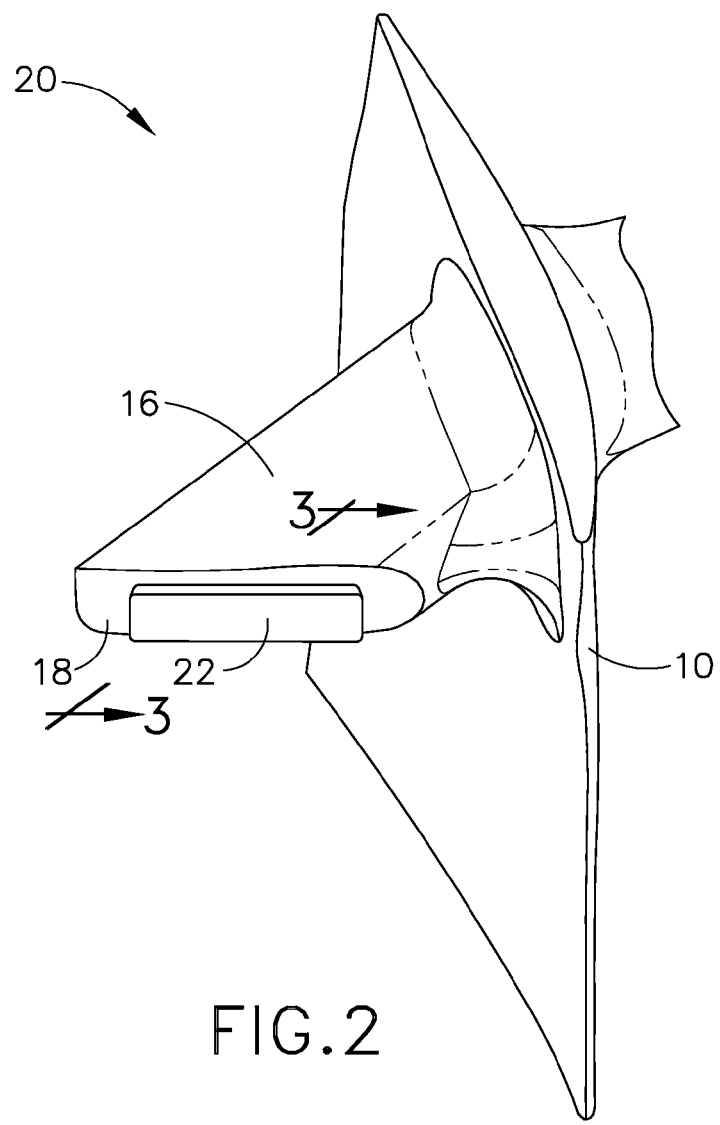
FIG. 2 is a partial perspective view showing an exemplary midspan shroud-wear pad assembly.

FIG. 2 illustrates an exemplary midspan shroud-wear pad assembly 20. In the assembly, a wear pad 22 is shown attached to contact face 18 of the midspan shroud 16. Wear pads are used with midspan shrouds 16 to address the wear problem addressed above. For example, some compressor blades made from titanium or alloys thereof may include a brazed-on WC—Co wear pad to prevent adhesive wear between two contacting midspan shrouds.

Figure 3:
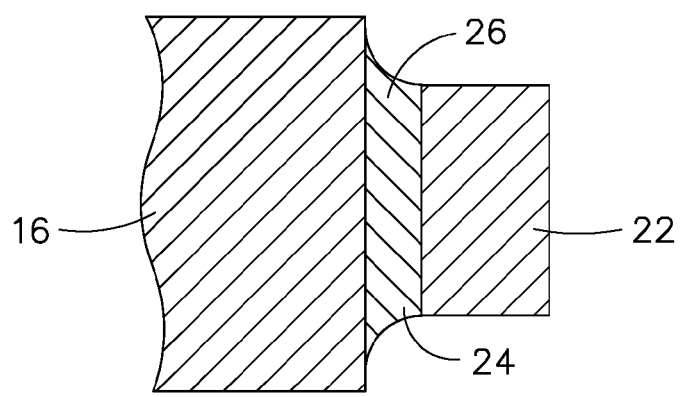
FIG. 3 is a cross-sectional view of the midspan shroud-wear pad assembly taken through 3-3 of FIG. 2.

FIG. 3 illustrates a braze joint 24 at the interface between a midspan shroud 16 and wear pad 22. Braze joint 24 comprises a brazing material 26 that, after brazing, provides an improvement in impact resistance of the braze joint 24 as compared to known prior art braze joints.

Embodiments disclosed here and are directed to brazing materials for brazing a first substrate, such as a WC—Co wear pad 22, to a second substrate, such as a midspan shroud comprising titanium or alloys thereof. Exemplary embodiments include gold (about 2 to about 30 wt %), nickel (about 4 to about 14 wt %), copper (about 25 to about 65 wt %), aluminum (about 1 to about 3 wt %) and silver (about 20 to about 55 wt %).

In an exemplary embodiment, the substrates are brazed at a brazing temperature generally below about 1800° F. (about 982° C.), thereby preventing damage to the mechanical properties of the substrates whose beta transus temperatures are at or above 1800° F. (982° C.). In particular, the alloys disclosed herein may include a nickel content sufficient to ensure wetting to both WC—Co and titanium substrates, a copper content that is sufficiently high to ensure ductility for impact resistance, and gold and silver content that is reasonably low to ensure adequate cost. Further, the brazing materials disclosed herein are able to braze the first substrate to the second substrate using induction heating below about 1800° F. (about 982° C.) at braze times of from about 1 to about 10 minutes. In an exemplary embodiment, the braze time may be from about 1 minute to about 3 minutes.

In an exemplary embodiment, the weight percentages of gold, nickel, copper, aluminum, and silver in the brazing material may be selected based upon the intended use of the brazing alloy. In particular, the weight percentages may be selected such that the resulting brazing alloy has a high impact resistance and high ductility (i.e., low hardness) after brazing and brazing temperatures below the beta transus temperature of the substrate being brazed such that the mechanical properties of the substrate are not negatively affected, for example, by way of phase transitions by high brazing temperatures.

In an exemplary embodiment the brazing material may include about 2 to about 30% by weight gold, about 4 to about 14% by weight nickel, about 25 to about 65% by weight copper, about 1 to about 3% by weight aluminum, and about 20 to about 55% by weight silver.

In an exemplary embodiment, the brazing material may include from about 2 to about 30% by weight gold, about 4 to about 14% by weight nickel, about 40 to about 60% by weight copper, about 1 to about 2% by weight aluminum, and about 20 to about 55% by weight silver.

In an exemplary embodiment, the brazing material may include from about 2 to about 30% by weight gold, about 5 to about 7% by weight nickel, about 40 to about 60% by weight copper, about 1 to about 2% by weight aluminum, and about 20 to about 55% by weight silver.

In an exemplary embodiment, the gold, nickel, silver, aluminum, and copper are present in amounts such that the brazing material has a post-braze hardness of between 450 and 600 KHN. In particular, in an exemplary embodiment, the copper content may be between about 40 and about 60 weight %.

In an exemplary embodiment, nickel is present in an amount sufficient to provide wetting to the first and second substrates during induction heating. In an exemplary embodiment, the duration of the induction heating process is at least about one minute. In an exemplary embodiment, the induction heating process is not greater than about 10 minutes. In an exemplary embodiment, the braze temperature is less than about 1800° F. (982° C.). In an exemplary embodiment, the braze temperature is between about 1600° F. (about 871° C.) and about 1750° F. (about 954° C.).

In an exemplary embodiment, the brazing material may include about 25.3% by weight gold, about 5.6% by weight nickel, about 46.1% by weight copper, about 1.1% by weight aluminum, and about 21.9% by weight silver.

In an exemplary embodiment, the brazing material may include about 4% by weight gold, about 13.3% by weight nickel, about 27.6% by weight copper, about 2.7% by weight aluminum, and about 52.4% by weight silver.

In an exemplary embodiment, the brazing material may include about 2.2% by weight gold, about 7.3% by weight nickel, about 60.3% by weight copper, about 1.5% by weight aluminum and about 28.7% by weight silver.

The brazing materials disclosed herein may be provided in various forms. For example, the brazing materials may be provided as homogenous compositions including gold, nickel, copper, aluminum, and silver. In other exemplary embodiments, the brazing materials may be provided as powders. In other exemplary embodiments, the brazing alloys may be provided as layered or laminated films or foils.

In a powdered form, the brazing alloys may be provided as mixtures of gold, nickel, copper, aluminum, and silver powders and/or powders of alloys of one or more of gold, nickel, copper, aluminum, and silver wherein the metals are present in the appropriate quantities. In an exemplary embodiment, the powders may form a homogeneous alloy upon being heated to the appropriate brazing temperature. For example, an exemplary brazing material may be provided as a dispersion of copper powder, gold/copper/nickel powder, and silver/aluminum powder.

In a layered form, the gold, nickel, copper, aluminum, and silver may be provided in separate layers, thereby providing homogeneous alloys upon being heated to the appropriate brazing temperature. For example, a brazing alloy may be provided as a laminated film or a layered material. For example, a layer of copper may be positioned between layers of gold/copper/nickel foil and silver/aluminum foil. Any combination of layers may be utilized to provide the alloying metals in the appropriate quantities.

Example 1

A brazing material is prepared using copper foil sandwiched between a layer of gold/copper/nickel foil and a layer of silver/aluminum foil. The thickness of each layer is selected such that the resulting layered material includes about 25.3 weight percent gold, about 5.6 weight percent nickel, about 46.1 weight percent copper, about 1.1 weight percent aluminum, and about 21.9 weight percent silver with respect to the total weight of the layered material. The resulting layered material has a brazing temperature of about 1700° F. (about 927° C.).

Example 2

A brazing material is prepared using copper foil sandwiched between a layer of gold/copper/nickel foil and a layer of silver/aluminum foil. The thickness of each layer is selected such that the resulting layered material includes about 4 weight percent gold, about 2.7 weight percent aluminum, and about 52.4 weight percent silver with respect to the total weight of the layered material. The resulting layered material has a brazing temperature of about 1690° F. (about 921° C.).

Example 3

A brazing material is prepared using copper foil sandwiched between a layer of gold/copper/nickel foil and a layer of silver/aluminum foil. The thickness of each layer is selected such that the resulting layered material includes about 2.2 weight percent gold, about 7.3 weight percent nickel, about 60.3 weight percent copper, about 1.5 weight percent aluminum, and about 28.7 weight percent silver with respect to the total weight of the layered material. The resulting layered material has a brazing temperature of about 1690° F. (about 921° C.).

Example 4

The layered material of Example 1 is rolled up and positioned between a WC—Co (2-10% cobalt) carboloy pad and a titanium alloy (90 wt % Ti, 6 wt % Al and 4 wt % V) midspan shroud and the assembly is raised to a temperature of about 1750° (954° C.) of by way of induction heating for about 10 minutes under vacuum about 10^-4 Torr. After the assembly is allowed to cool, the braze joint has a hardness of about 470 KHN.

Example 5

The layered material of Example 2 is rolled up and positioned between a WC—Co (2-10% cobalt) carboloy pad and a titanium alloy (90 wt % Ti, 6 wt % Al, and 4% V) midspan shroud and the assembly is raised to a temperature of about 1750° F. (954° C.) by way of induction heating for about 10 minutes under vacuum (about 10^-4 Torr). After the assembly is allowed to cool, the braze joint has a hardness of about 500 KHN.

Example 6

The layered material of Example 3 is rolled up and positioned between a WC—Co (2-10% cobalt) carboloy pad and a titanium alloy (90 wt % Ti, 6 wt % Al, and 4 wt % V) midspan shroud in the assembly is raised to a temperature of about 1750° (954° C.) by way of induction heating for about 10 minutes under vacuum about 10^-4 Torr. After the assembly is allowed to cool the braze joint has a hardness of about 495 KHN.

In an exemplary embodiment, a method for improving the impact resistance of a braze joint 24 between a first substrate (i.e., wear pad 22) and a second substrate. (i.e., midspan shroud 16) includes providing a brazing assembly including the first substrate the second substrate and a brazing material disposed therebetween. Any of the aforementioned exemplary brazing materials 26 may be utilized. In particular, the wear pad 22 may be brazed to the contact surface 18 of the midspan shroud. In an exemplary embodiment, the brazing material comprises gold, nickel, copper, aluminum, and silver in respective amounts such that, after brazing, the braze joint 24 has a hardness of between about 450 and 600 KHN and an impact resistance of greater than about 0.60 Joules. The brazing material may be provided in any of the aforementioned forms, including layered, powdered, or homogeneous forms.

In an exemplary method, providing a midspan shroud includes providing a midspan shroud requiring repair due to a damaged wear pad. In an exemplary method, the damaged wear pad is removed by mechanical or chemical means. For example, the blade may be subjected to a grinding process to remove the worn wear pad and prior braze material. Alternately, the worn wear pad may be chemically removed. If necessary, the midspan shroud may be subjected to further processes in preparation for brazing on a new wear pad (i.e., material build up, machining to specifications, and the like).

An exemplary method further includes brazing the first substrate to the second substrate. In an exemplary method, an induction heating process is utilized for brazing. The brazing assembly (i.e., midspan shroud 16, brazing material 26, wear pad 22) may be placed into a vacuum chamber. The midspan shroud 16 may be placed into an induction coil. AC current passing through the coil generates a magnetic field in the midspan shroud, generating eddy currents in the shroud to rapidly increase the temperature to the brazing range. In exemplary embodiments, the brazing temperature is between about 1600° F. (about 871° C.) and about 1750° F. (about 954° C.). In other exemplary embodiments the brazing temperature may be up to about 1800° F. (about 982° C.). Duration for the braze may be about 1-3 minutes. In other exemplary embodiments, the braze duration may be up to about 10 minutes. In an exemplary embodiment, the braze duration is at least about 1 minute. In an exemplary embodiment, the brazing is accomplished under vacuum of about 10^-5 Torr.

Thus, embodiments disclosed herein provide brazing materials, methods of brazing, and brazed articles wherein the brazing materials provide post-braze joints having increased ductility. The gold/nickel/copper/aluminum/silver brazing materials disclosed herein provide good wetting when brazing WC—Co substrates to titanium or alloys thereof at brazing temperatures of less than about 1800° F. (982° C.) during induction heating of less than about 10 minutes.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An article comprising:
   a first substrate comprising WC—Co material;
   a second substrate comprising titanium or alloys thereof; and
   a braze joint at the interface of the first substrate and the second substrate, wherein the braze joint is formed from a brazing material consisting of about 2 to about 30 percent by weight gold, about 4 to about 14 percent by weight nickel, about 25 to about 65 percent by weight copper, about 1 to about 3 percent by weight aluminum, and about 20 to about 55 percent by weight silver.

2. The article according to claim 1 wherein the second substrate is a midspan shroud of a fan or compressor blade for a gas turbine engine.

3. The article according to claim 2 wherein the first substrate is a wear pad.

4. The article of claim 3 wherein the wear pad is brazed to a contact face of the midspan shroud.

* * * * *